(12) United States Patent
O'Connor et al.

(10) Patent No.: US 8,086,783 B2
(45) Date of Patent: Dec. 27, 2011

(54) HIGH AVAILABILITY MEMORY SYSTEM

(75) Inventors: James A. O'Connor, Ulster Park, NY (US); Kevin C. Gower, LaGrangeville, NY (US); Luis A. Lastras-Montano, Cortlandt Manor, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/390,731

(22) Filed: Feb. 23, 2009

(65) Prior Publication Data

US 2010/0217915 A1 Aug. 26, 2010

(51) Int. Cl.
*G06F 12/00* (2006.01)
(52) U.S. Cl. .......................................................... 711/5
(58) Field of Classification Search .................... None
See application file for complete search history.

(56) References Cited

U.S. PATENT DOCUMENTS

| | | | |
|---|---|---|---|
| 5,991,850 A | 11/1999 | Ryan | |
| 6,944,731 B2 * | 9/2005 | Bouchard et al. | 711/161 |
| 7,089,379 B1 * | 8/2006 | Sharma et al. | 711/154 |
| 7,130,229 B2 * | 10/2006 | Dahlen et al. | 365/200 |
| 7,200,021 B2 | 4/2007 | Raghuram | |
| 7,266,639 B2 | 9/2007 | Raghuram | |
| 2006/0126369 A1 | 6/2006 | Raghuram | |
| 2006/0179362 A1 | 8/2006 | Alves et al. | |
| 2006/0245226 A1 | 11/2006 | Stewart | |
| 2008/0320254 A1 * | 12/2008 | Wingard et al. | 711/157 |

* cited by examiner

*Primary Examiner* — Brian Peugh
(74) *Attorney, Agent, or Firm* — Cantor Colburn LLP

(57) ABSTRACT

A memory system with high availability is provided. The memory system includes multiple memory channels. Each memory channel includes at least one memory module with memory devices organized as partial ranks coupled to memory device bus segments. Each partial rank includes a subset of the memory devices accessible as a subchannel on a subset of the memory device bus segments. The memory system also includes a memory controller in communication with the multiple memory channels. The memory controller distributes an access request across the memory channels to access a full rank. The full rank includes at least two of the partial ranks on separate memory channels. Partial ranks on a common memory module can be concurrently accessed. The memory modules can use at least one checksum memory device as a dedicated checksum memory device or a shared checksum memory device between at least two of the concurrently accessible partial ranks.

25 Claims, 8 Drawing Sheets

HIGH AVAILABILITY MEMORY SYSTEM

BACKGROUND

This invention relates generally to computer memory systems, and more particularly to a memory system of semiconductor devices in a modular architecture with high availability characteristics that are realized through the use of partial ranks, multiple memory channels, and/or concurrently accessible partial ranks that minimize the impact of failures. Using the inventive features described herein enables the memory system to continue to operate unimpaired in the presence of a full memory module failure.

Contemporary high performance computing memory systems are generally composed of one or more dynamic random access memory (DRAM) devices, which are connected to one or more processors via one or more memory control elements. DRAMs may be organized as one or more dual in-line memory modules (DIMMs). Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering substantially greater system memory capacity, additional functions, increased performance, reduced latency, increased storage, lower operating costs, etc. Other frequent customer requirements further exacerbate the memory system design challenges, and include such items as ease of upgrade and reduced system environmental impact (such as space, power and cooling).

As computer memory systems increase in performance and density, new challenges continue to arise. For example, random access memory (RAM) devices of a computer system may include hundred of trillions of bits. A failure of a single RAM bit can cause the entire computer system to fail when error correction circuitry (ECC) is not utilized. It is most common for ECC to correct more minor failures, such as single bit, single symbol and some minor multi-bit or multi-symbol failures. ECC most commonly used in memory systems cannot correct for full memory module (DIMM) failures. ECC capable of correcting for full DIMM failures has not been exploited, because it would result in design tradeoffs deemed unacceptable (e.g., cost, larger cache line sizes, reduced performance, etc.). When hard errors occur, such as single cell, multi-bit, full chip or full DIMM failures, all or part of the system RAM may remain down until it is repaired.

SUMMARY

An exemplary embodiment is a memory system with high availability. The memory system includes multiple memory channels. Each memory channel includes at least one memory module with memory devices organized as partial ranks coupled to memory device bus segments. Each partial rank includes a subset of the memory devices accessible as a subchannel on a subset of the memory device bus segments. The memory system also includes a memory controller in communication with the multiple memory channels. The memory controller distributes an access request across the memory channels to access a full rank. The full rank includes at least two of the partial ranks on separate memory channels. Partial ranks on a common memory module can be concurrently accessed. The memory modules can use at least one checksum memory device as a dedicated checksum memory device or a shared checksum memory device between at least two of the concurrently accessible partial ranks.

Another exemplary embodiment is a method for providing a memory system with high availability. The method includes configuring the memory system as multiple memory channels accessible in parallel via a memory controller. Each memory channel includes at least one memory module with memory devices organized as partial ranks coupled to memory device bus segments. Each partial rank includes a subset of the memory devices accessible as a subchannel on a subset of the memory device bus segments. The method further includes storing checksums calculated across the memory channels. The method also includes performing a memory access to a full rank including at least two of the partial ranks on separate memory channels. The method additionally includes utilizing the checksums to perform error checking and correct one or more error values detected in response to the memory access to the full rank.

A further exemplary embodiment is a computer program product for providing a memory system with high availability. The memory system includes multiple memory channels accessible in parallel via a memory controller; each memory channel includes one or more memory modules with multiple semiconductor memory devices. The computer program product includes a storage medium readable by a processing circuit and storing instructions for execution by the processing circuit for facilitating a method. The method includes storing checksums calculated across the memory channels, and performing a memory access across the memory channels to a subset of the semiconductor memory devices on each of the memory channels. The subset is a partial rank of a full rank distributed across the memory channels. The method further includes utilizing the checksums calculated across the memory channels to perform error checking and correct one or more error values detected in response to the memory access.

An additional exemplary embodiment is a memory system with high availability. The memory system includes at least two memory modules on separate memory channels. Each memory module includes a partial rank of semiconductor memory devices arranged on the memory module to output a burst of data words in response to an access request, the partial rank having a data width of thirty-two bits. The partial ranks from at least two of the memory channels are combined to form a full rank. One or more memory devices are used to store one or more checksums calculated across the full rank and support error correction for a failure of one or more of the memory modules. Optionally, at least one of the memory modules can include a checksum memory device configured to store a checksum calculated across the semiconductor memory devices of the memory module and adding eight bits in width to the partial rank of the memory module.

An additional exemplary embodiment is a memory module. The memory module includes a single rank of eight or nine semiconductor memory devices arranged on the memory module as at least two partial ranks to output a burst of data words per partial rank in response to an access request, each semiconductor memory device outputting four or more bits per data word. The ninth optional device is a dedicated checksum memory device.

A further exemplary embodiment is a memory module. The memory module includes at least nine semiconductor memory devices arranged on the memory module with at least eight of the semiconductor memory devices configured as at least two partial ranks to output a burst of data words per partial rank with eight bits per data word in response to an access request. At least one semiconductor memory device can be added as a checksum memory device outputting a checksum value in response to the access request. The memory module may be partitioned into multiple concurrently accessible partial ranks, where each concurrently accessible rank is independently accessible via independent subchannels on separate busses of a communication link. The checksum memory device can be shared between at least two of the concurrently accessible partial ranks, or dedicated checksum memory devices can be allocated per concurrently accessible partial rank.

Other systems, methods, apparatuses, and/or computer program products according to embodiments will be or become apparent to one with skill in the art upon review of the following drawings and detailed description. It is intended that all such additional systems, methods, apparatuses, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
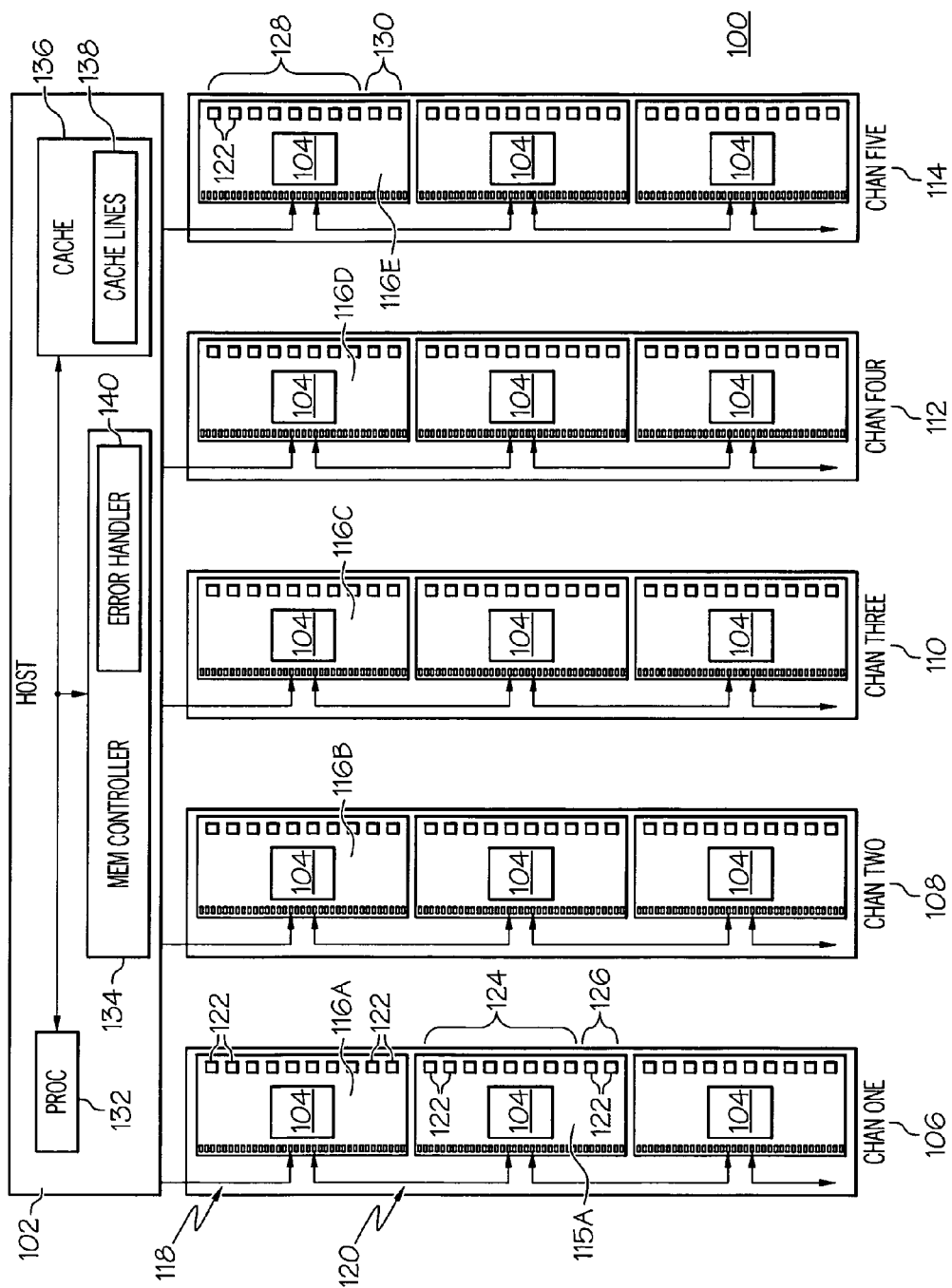
FIG. 1 depicts a memory system that may be implemented by exemplary embodiments.

The invention as described herein provides a memory system of memory devices (e.g., semiconductor memory devices) in a modular architecture with high availability characteristics that are realized through the use of partial ranks, multiple memory channels and/or concurrently accessible partial ranks that minimize the impact of failures. A partial rank refers to a subset of memory devices on a memory module. For example, a memory system can include two or more memory channels with at least one memory module per channel, and four or more memory devices per memory module. While prior systems may access all memory devices of a single memory module as a full rank, exemplary embodiments as described in greater detail herein, can access separate partial ranks on different memory channels as a full rank. Distributing an equivalent or near equivalent amount of data across multiple memory channels may reduce the impact of an error or failure of a memory module with respect to the full rank. Where previous systems could lose an entire rank of memory, e.g., covering a full data bus width of a memory module, managing memory modules as partial ranks covering part of the data bus width of a memory module can increase overall memory system availability. In an exemplary embodiment, the memory system is able to continue unimpaired operation in the presence of a full memory module failure.

Semiconductor memory devices (e.g., RAM, ROM, Flash, and Solid State Drives) are typically used to hold volatile programs and data, such as operating system software, programs and other data while a computer is powered on and operational. One or more hard disk drives (HDDs) are typically used for nonvolatile storage, allowing programs and data to persist through power cycling. HDDs may be more error prone, for instance, due to mechanical effects. A redundant array of independent disks (RAID) may be used to improve HDD availability and performance. RAID algorithms may not be directly implemented on RAM-based memory system due to a variety of reasons. For instance, RAM storage is more expensive than HDD storage and thus it is less palatable to adding a substantial number of imbedded checkers directly into the storage medium. With a limited number of imbedded checkers, it is far more difficult to pinpoint data faults. Another significant barrier to the application of RAID-like error correction code (ECC) techniques to RAM is an increasing burst length with each generation of memory devices. For example, each generation of double data rate (DDR) dynamic random access memory (DRAM) has increased the standard burst length, which is defined as the number of data symbols supplied during a read or write access. DDR may have a burst length of 2. Thus, each x4 DRAM supplies two 4-bit nibbles on each access and x8 DDR DRAMs supply two 8-bit bytes on each access. The standard burst length for DDR2 is 4, while DDR3 has a burst length of 8.

Another obstacle to applying RAID-like ECC techniques to dual in-line memory modules (DIMMs) of DRAM devices is that the operational characteristics that cannot be easily modified, especially for "industry standard" DIMMs. Physical containment and isolation provided by components used in the design of a DIMM can present a further challenge in applying RAID-like ECC techniques to DIMMs. For example, a DRAM failure can cause parts of the DRAM chip to no longer operate properly. At times the entire DRAM chip can fail. Soft errors, transient data errors, can also occur due to bit flips associated with normal background radiation such alpha particles and cosmic rays. The degree to which a fault can be contained within a physical entity directly impacts the effectiveness of error correction techniques.

In an exemplary embodiment, a memory system is provided that substantially improves memory fault correction while maintaining or shrinking cache line size and still avoiding a substantial loss in available memory space for customer usable data. The memory system may facilitate RAID-like capabilities for multi-memory channel DIMMs, including architectures where only a subset of the DRAMs on each DIMM provide data on any one access as a partial rank. A full rank can be accessed across multiple channels as multiple partial ranks on separate DIMMs. For example, one memory channel can provide half of a rank and a second memory channel can provide the other half of the same rank. While embodiments are described using x4 and x8 DRAMs configurations, other DRAM architectures and configuration can also be utilized, such as x16 DRAMs (e.g., 16-bit wide memory devices). In an exemplary embodiment, a degree of memory fault recovery is provided with DIMMs attached to 4 memory channels over which a cache line is stored. Thus processing circuitry can access values stored in cache memory that represent memory distributed across multiple memory devices on multiple DIMMs divided into multiple channels. An optional fifth memory channel (also referred to as an error correction memory channel) may be used to provide RAID-like error correction capability for memory devices (e.g., DRAMs) that enable the memory system to withstand a complete DIMM failure and an additional, less catastrophic, failure coincident with a complete DIMM failure.

Although the embodiments described herein utilize four main memory channels with an optional fifth channel, other numbers of memory channels can be used in within the scope of the invention. For example, there may be six or ten main memory channels with two optional channels to hold additional meta-data, such as checksums, to extend the fault isolation and correction capabilities. Fault isolation can be performed using, for instance, Reed-Solomon coding.

Exemplary embodiments also include concurrently accessible partial ranks of memory devices on each DIMM, also referred to as concurrently accessible ranks. Typical multi-rank DIMMs may appear as multiple logical DIMMs residing on a single physical DIMM. For example, a two-rank DIMM can include 9 DRAM chips per rank and 18 DRAM chips total, such that only one rank or group of 9 DRAM chips is accessible at time. The memory channel to which this multi-rank DIMM is connected may have the capability to convey as much information as a single rank can accept (during writes) or convey (during reads). That is, typical multi-rank DIMMs are constructed so as to increase the total capacity installed in the rank while maintaining the access bandwidth similar to that of a single rank DIMM (or even lower bandwidth, if lower speeds are used with the multi-rank design). Multi-rank DIMMs can be constructed by electrically coupling together lines that serve the same purpose for multiple ranks (sometimes known as "dotting lines"), so that only one rank can communicate or receive information at any given time. Therefore, the memory channel that is connected to this multi-rank DIMM is logically architected as a communication medium that may only convey information from a single rank of a potentially multi-rank DIMM at a given time.

In an exemplary embodiment, multi-rank DIMMs include partial ranks that are accessible simultaneously and not limited to being accessed only at times when the other partial ranks are not being accessed. The term "Concurrently-Accessible Rank", "Concurrently-Accessible Partial Rank", or simply "CA-Rank" is used distinguish these from typical ranks. Moreover, each rank on a multi-rank DIMM can provide a portion of a full rank, where the full rank can be accessed across multiple memory channels (e.g., two or more). In an exemplary embodiment, a memory channel (or simply a "channel") includes multiple logical subchannels, each of which may convey the information of a CA-rank. Each channel can include at least two logical subchannels capable of concurrently conveying information from at least two CA-ranks of a DIMM that has multiple CA-ranks. Concurrent access implies that distinct CA-ranks can access information at entirely different addresses at the same time. This is in sharp contrast with a typical DIMM that performs accesses at the same address for all memory devices. CA-ranks may partition a full rank into two or more smaller CA-ranks, incorporating logic to inform the distinct CA-ranks which address and command are supposed to be executed. The result of a read and/or write is conveyed through a bus (the bus of the channel) that may be unchanged in width with respect to the standard full rank on a single DIMM. Thus, such a bus can simultaneously convey the information from multiple CA-ranks obtained by partitioning the original full rank.

Turning now to FIG. 1, an example of a memory system 100 is shown which includes a host system 102 is in communication with multiple memory channels, such as channel one 106, channel two 108, channel three 110, channel four 112, and optionally channel five 114. The optional channel five 114 is also referred to as an error correction channel. The channels 106-114 may be configured as one or more cascaded interconnected memory modules or assemblies, referred to generically as DIMMs 116. For example, a communication link 118 may be coupled to the host system 102 and DIMM 116A to provided communication between the host system 102 and channel one 106, where DIMM 116A represents one of the DIMMs 116 of the channel one 106. DIMM 116A may be cascade interconnected to multiple DIMMs 116 as part of the channel one 106. For instance, DIMM 116A is coupled to DIMM 116F of the channel one 106 via communication link 120. The communication links 118 and 120 can include multiple busses, including independent and concurrently accessible busses for each partial rank on the DIMMs 116. The cascaded chain of DIMMs 116 can be extended to include any number of DIMMs 116 in channel one 106. Similarly, channels 108-114 include cascade interconnected DIMMs 116, with the host system 102 connecting to DIMMs 116B, 116C, 116D, and 116E of channels two 108, three 110, four 112, and five 114 respectively.

Communications between the host system 102 and the DIMMs 116 may be routed via hub devices 104. The hub devices 104 are also referred to as buffer devices, since they can perform data rate and protocol conversion and buffering between one or more local busses with memory device bus segments of the DIMMs 116 and the communication links 118 and 120. Each of the DIMMs 116 may include at least one hub device 104 to serve as a communication interface between the host system 102, other DIMMs 116, and memory devices 122. Alternatively, hub devices 104 can be incorporated on the host system 102 in a planar configuration. The memory devices 122 may be semiconductor DRAM chips, such as DDR2, DDR3, DDR4, DDRx, etc. In the example depicted in FIG. 1, each of the DIMMs 116 includes ten memory devices 122. The memory devices 122 may be allocated for specific purposes, such as eight memory devices 122 for data storage 124 and two memory devices 122 checksum storage 126 per DIMMs 116 of channels 106-112. Optional channel five 114 may include eight memory devices 122 for parity storage 128 and two memory devices 122 for additional checksum storage 130 per DIMM 116 (e.g., DIMM 116E).

In an exemplary embodiment, the host system 102 includes processing circuitry 132, a memory controller 134, a cache memory 136 that stores multiple cache lines 138, and an error handler 140. It will be understood that the host system 102 includes other elements known in the art (not depicted) to support a computer system, such as one or more power supplies, input/output devices or interfaces, communication network interfaces, non-volatile storage, and the like. Moreover, the processing circuitry 132, memory controller 134, cache memory 136, and error handler 140 can be integrated or merged in any combination within the scope of the invention. For instance, the error handler 140 can be a component of the memory controller 134 or be implemented in separate circuitry. The processing circuitry 132 can include one or more processing cores to support parallel processing. The memory controller 134 handles interface between the channels 106-114 and the cache memory 136. For example, the memory controller 134 may fetch stored values from across the channels 106-114 to update one or more of the cache lines 138. The error handler 140 may use checksum values or other metadata read from the checksum storage 126, parity storage 128, and/or additional checksum storage 130 to detect and correct errant or missing values. The values from data storage 124 or corrected values from the error handler 140 are written to the cache lines 138. This enables the processing circuitry 132 to interact with only data or corrected data values, making error detection and correction transparent to software processes running on the processing circuitry 132. The error handler 140 may also set flags or raise exceptions in response to determining that an error condition has been detected but could not be corrected.

As the memory system 100 of FIG. 1 is expanded, DIMMs 116 can be added in blocks of 4 or 5 connected horizontally across the memory channels 106-114. Having equal amounts of storage on each of the channels 106-114 may maximize the percentage of memory available for customer storage while implementing fault detection and correction.

Even though populating the channel five 114 is optional, when utilized, it provides greatly enhanced memory symbol fault isolation and correction. In this example a symbol is equal to one byte, but other symbol sizes may be supported. Channel five 114 may employ a RAID-like memory correction capability that substantially improves fault detection and correction by increasing the number of checksum symbols. Since channel five 114 is optional, the first four memory channel configuration (channels 106-112) is architected to provide memory fault recovery capabilities without channel five 114. Nevertheless, utilizing channel five 114 enables the memory system 100 to recover from a complete memory channel failure. For instance, if all the DIMMs 116 on any one channel 106-112 fail or access to them is loss through a bus/communication link failure, the memory system 100 can continue to run unimpaired. The memory system 100 is designed and architected so that it will continue to run unimpaired if any of the 5 memory channels 106-114 fail. In addition, the memory system 100 can tolerate an additional failure coincident with this catastrophic complete memory channel failure. The error handler 140 can locate and correct this secondary fault, enabling the memory system 100 to continue running unimpaired. A secondary fault may occur during the time period between encountering a catastrophic fault and repairing the fault. Secondary fault protection is particularly important to protect from transient memory soft errors due to normal background radiation, such as alpha particles and cosmic rays, which can cause bit flips in memory. The memory system 100 also provides for concurrent repair since all DIMMs 116 on a given memory channel 106-114 can be removed and replaced while the memory system 100 continues to operate normally from an end user perspective. This feature is referred to as "hot swapping" DIMMs.

The error detection and correction implemented by the error handler 140 may include ECC codes in the checksum storage 126 and parity in the parity storage 128. In an exemplary embodiment, the additional checksum storage 130 is calculated on the values in the checksum storage 126. Reed-Solomon codes may be used to calculate error correction values. In alternate embodiments, variations of coding schemes are used for error detection and correction, such as equations that operate on elements of a finite field, also referred to as a Galois Field. A Galois Field includes of a set of a finite number of elements together with addition and multiplication operations. Particularly useful classes of Galois Fields are those that are an extension of a base Galois Field. For example, a Galois Field that has 256 elements may be seen as an extension of the Galois Field that has two elements (the binary Galois Field), and since 8 binary bits suffice to describe 256 possibilities, the degree of the extension Galois field with 256 elements is 8. An element from a Galois Field that is an extension of another Galois Field may be described as a polynomial having a bounded degree p, where p is the degree of the extension and where the coefficients come from the smaller field. Additive and multiplicative operations on the Galois Field can then be implemented through standard polynomial addition and multiplication, where the results are taken modulo a polynomial that must have the property that is irreducible. An irreducible polynomial is one that cannot be factorized in smaller degree polynomials with coefficients in a given Galois Field. In this respect, irreducible polynomials are analogous to prime numbers. A primitive polynomial is a type of irreducible polynomial. The error handler 140 can solve for a series of simultaneous equations using data symbols or the location of faulted symbols as the unknowns. For example, data elements from DIMMs 116 across the channels 106-114 can be viewed as rows, and data elements from DIMMs 116 down each of the channels 106-114 can be viewed as columns to generate 2 independent checksums to the data elements in each row. This can be defined as:

Q(x)=Reed-Solomon checksum where x=a
P(x)=Reed-Solomon checksum where x=1
d0, d1, . . . , d(N−1)=polynomial coefficients Reed-Solomon checksum equations have the polynomial form:

$$Q(x)=d0+d1*x+d2*x^2+\ldots d(N-1)*x^{(N-1)}$$

The equation can be used to solve for coefficients, to correct a data element or if the location of the fault is unknown it can be used to solve for the power of x to pinpoint the location. Using a simple exclusive-or (XOR) operation, where x=1, the P equation becomes:

$$P(x)=d0+d1+d2+\ldots d(N-1)$$

It will be understood that the equations presented herein represent high-level, simplified examples. For example, checksums can apply Reed-Solomon codes to correct for a failure in one of the memory channels 106-114 by erasure marking memory devices 122 that are identified (or suspected) as having incorrect information and feeding the erasure marks to a decoder that is capable of marked erasure decoding in the error handler 140. Other techniques known in the art can also be utilized within the scope of the invention.

Figure 2:
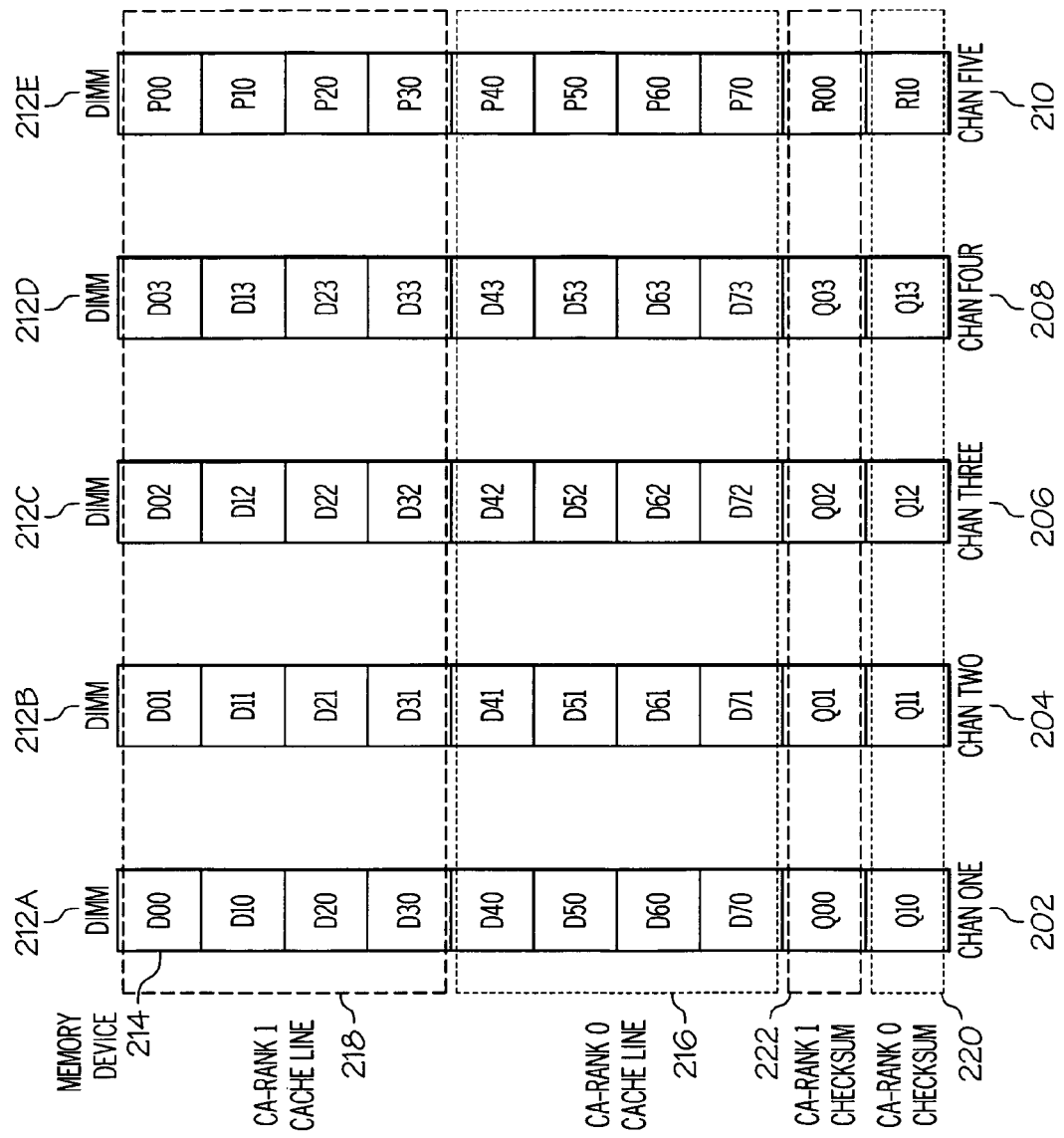
FIG. 2 depicts a memory system configuration with five memory modules and ten memory devices per memory module in accordance with exemplary embodiments.

FIG. 2 depicts logical representation of a memory system configuration with five memory modules and ten memory devices per memory module, such as the memory system 100 of FIG. 1. Each column represents a single module of a single memory channel (e.g., channel one 202, channel two 204, channel three 206, channel four 208, and channel five 210) of a DIMM (e.g., DIMM 212A, 212B, 212C, 212D, and 212E), where each DIMM 212A-E includes ten DRAM memory devices 214. Looking across the memory channels 202-208, Dxy (D00, D01 . . . D73) are DRAM memory devices 214 that may store customer usable data (data memory devices).

DRAMs that hold checksum information (checksum memory devices) on each DIMM 212A-E are represented by Qxy (Q00, Q01, ... Q13). These Qxy DRAMs may hold checksum information calculated across the customer usable data space D00-D73 using Reed-Solomon ECC generation techniques or more generally linear codes, preferably with a Maximum Distance Separable (MDS) property which ensures that the codes provide maximum error correction and detection strength.

In the example of FIG. 2, as in FIG. 1, channel five 210 can optionally be included to enhance error detection and correction, and thus is also referred to as an error correction channel. When DIMM 212E is added to the optional memory channel five 210, the number of DRAMs memory device 214 holding checksum data increases from 8 to 18 DRAMs. This is a substantial increase that greatly improves the fault isolation and error correction capabilities of the code. In an exemplary embodiment, the DRAM memory devices 214 of DIMM 212E are used to implement Reed-Solomon coding for memory symbol fault isolation and correction. Alternatively, other techniques can also be used for fault isolation and correction. For example, memory channel five 210 may hold a special purpose code. The DRAM memory devices 214 on the memory channel five 210 can hold RAID-like parity Pxy (P00, P01, ... P07) generated across each horizontal DRAM row across the DIMMs 212A-212D. In other words, P01 may hold the exclusive-or (XOR) parity sum of P00=D00+D01+D02+D03, P10=D10+D11+D12+D13, and so on for each corresponding customer usable data symbol that has been stored. DIMM 212E on channel five 210 also have two DRAMs, R00 and R01, that hold RAID-like parity generated across each DRAM row across the DIMMs 212A-212D. In other words, P01 may hold the XOR parity sum of R00=Q00+Q01+Q02+Q03 for each corresponding checksum symbol that has been stored. Pxy and Rxy may also be referred to as checksum memory devices.

Typically, a memory system configuration with 4 DIMMs of 8 data DRAMs each would store 256 Bytes of customer usable data per access, assuming that 8—x8 data DRAMs on each of the 1st 4 DIMMs 212A-212D store customer usable data with a burst length of 8. This would result in a cache line width of 256 Bytes in the cache lines 138 of FIG. 1. As burst length doubles and quadruples, the data per access doubles and quadruples as well with all else equal. This wide cache line width can increase the complexity of accessing the cache 136 of FIG. 1, particularly if the processing circuitry 132 includes multiple processing cores operating in parallel. In an exemplary embodiment, cache line sizes are reduced by partitioning the DIMMs 212A-E into multiple concurrently accessible ranks. The configuration illustrated in FIG. 2 illustrates an embodiment with 2 concurrently accessible ranks (CA-Rank 0, CA-Rank 1).

In an exemplary embodiment, CA-Rank 1 includes: D00, D01, D02, D03, D10, D11, D12, D13, D20, D21, D22, D23, D30, D31, D32, D33 which store 128 Bytes of customer usable data and Q00, Q01, Q02, Q03, P00, P10, P20, P30, R00 which hold checksum data. In addition, CA-Rank 0 includes: D40, D41, D42, D43, D50, D51, D52, D53, D60, D61, D62, D63, D70, D71, D72, D73 which store another 128 Bytes of customer usable data and Q10, Q11, Q12, Q13, P40, P50, P60, P70, R10 which hold checksum data. The DIMM interface (e.g., on communication links 118 and 120 of FIG. 1) may be increased by adding another independent data bus and independent control lines. The configuration depicted in FIG. 2 can result in a cache line 216 associated with CA-Rank 0 to include 128 Bytes and cache line 218 associated with CA-Rank 1 to also include 128 Bytes. The contribution of individual DIMMs 212 to cache line 216 may be referred to as partial ranks, where a full rank can be equivalent to a combination of partial ranks. For example the contribution of DIMM 212A and 212B to the cache line 216 may be equivalent to one full rank, and the contribution of DIMM 212C and 212D to the cache line 216 can be equivalent to a second full rank. Alternatively, a full rank may include contributions from partial ranks on DIMMs 212A-D or 212A-E. The same terminology may be employed with respect to cache line 218, and in subsequent figures.

In an exemplary embodiment, two checksum DRAM memory devices (e.g., Q00 and Q10) per DIMM provides additional checksum symbols as compared to using a single checksum DRAM memory device per DIMM. Subdividing the DIMMs 212A-E into two ranks with separate checksums per rank may improve the robustness of the error correction capability enabling fault correction even in the presence of a full DRAM failure. Up to 2 full DRAM faults can be located and corrected with 4 checksum DRAMs using standard codes like Reed-Solomon. Checksum 220 distributed across Q10-Q13 associated with CA-Rank 0 and checksum 222 distributed across Q00-Q03 associated with CA-Rank 1 may include 32 bytes each.

Even without the optional memory channel five 210 in FIG. 2, there is a total of 32 Bytes of checksums, 8 Bytes per each of the 4 Qxy's associated with CA-Rank0 or CA-Rank1. When memory channel five 210 is not used, standard Reed-Solomon ECC can be used to both locate and correct a memory fault. Using 32 checksum symbols, results in the ability to locate and correct up to 16 symbols with faults. Assuming that there are 8 Byte-symbols per DRAM, the ECC can correct up to 2 full DRAM failures. Since the DRAMs may physically contain 8 symbols, each ECC can take the physical packaging layout into account and through marking, identify a symbol fault and remember it. This approach increases the effectiveness of the ECC because the identified fault location no longer needs to be determined, increasing the ECC effectiveness.

A further complication is that some computer system designs associate additional non-checksum meta-data, with stored cache lines that are used to provide other capabilities such as improved performance. In an exemplary embodiment, even though Q00-Q13 of FIG. 2 are referred to as checksum memory devices, some of the checksum symbols in Q00-Q13 of FIG. 2 may hold other information while still providing robust memory fault recovery. Full DRAM chip kill protection, plus the correction of additional errors coincident with a DRAM failure may be achieved. This additional coincident memory fault correction capability can protect against a secondary fault (e.g., a soft memory error) before the memory system is repaired.

When channel five 210 is used to provide full RAID-like capability, a complete DIMM failure can be tolerated allowing the memory system to continue to run unimpaired. In fact, a full memory channel failure (e.g., channels 202-210) can be tolerated. The memory system illustrated FIG. 2 can have 1 or more DIMMs on a memory channel fail and the memory system can continue to run unimpaired. This may also enable hotswap replace the failed DIMMs in a memory channel.

With the addition of channel five 210, there are 18 checksum DRAMs: Q00, Q01, Q02, Q03, R00, Q10, Q11, Q12, Q13, R10, P00, P10, P20, P30, P40, P50, P60, P70, each of which can hold 8 checksum symbols. In the event of a full memory channel failure, 10 DRAMs are affected (e.g., D00-D70, Q00 and Q10), so standard Reed-Solomon decoding techniques which perform bounded distance decoding may be inadequate. With 18 checksum DRAMs on only half of that or 9 DRAM faults can be pinpointed and correct. Another technique known as list decoding may be used to pinpoint and mark a faulty DIMM. This technique can be seen as a procedure that assumes that each DIMM is the one that has the error, and determines whether the syndromes of the code agree with that assumption. Normally, only one of the assumptions for the location of the DIMM in error would turn out to be true. In some instances, the list of DIMMs that could be faulty has more than one element (hence the term list decoding), in which case the failing DIMM is unknown in the absence of any further information. Once the faulty DIMM is identified, the checksum symbols from 10 DRAMs can be used to regenerate the data. This leaves the symbols in the remaining 8 checksum DRAMs which may be used for secondary faults coincident with a full memory channel failure, allowing up to 4 complete DRAM failures to be isolated and corrected. Since the architecture in FIG. 2 is split into 2 CA-Ranks, the checksum DRAM are split equally across CA-Rank0 and CA-Rank1. This allow up to 2 full DRAM failures, or the equivalent in single symbol failure, 16 total to be isolated and corrected. This provides extremely robust recovery and overcomes issues associated with the increasing burst length, as well as migration from x4 to x8 DRAMs, all of which trend toward generating greater amounts of data per access.

Figure 3:
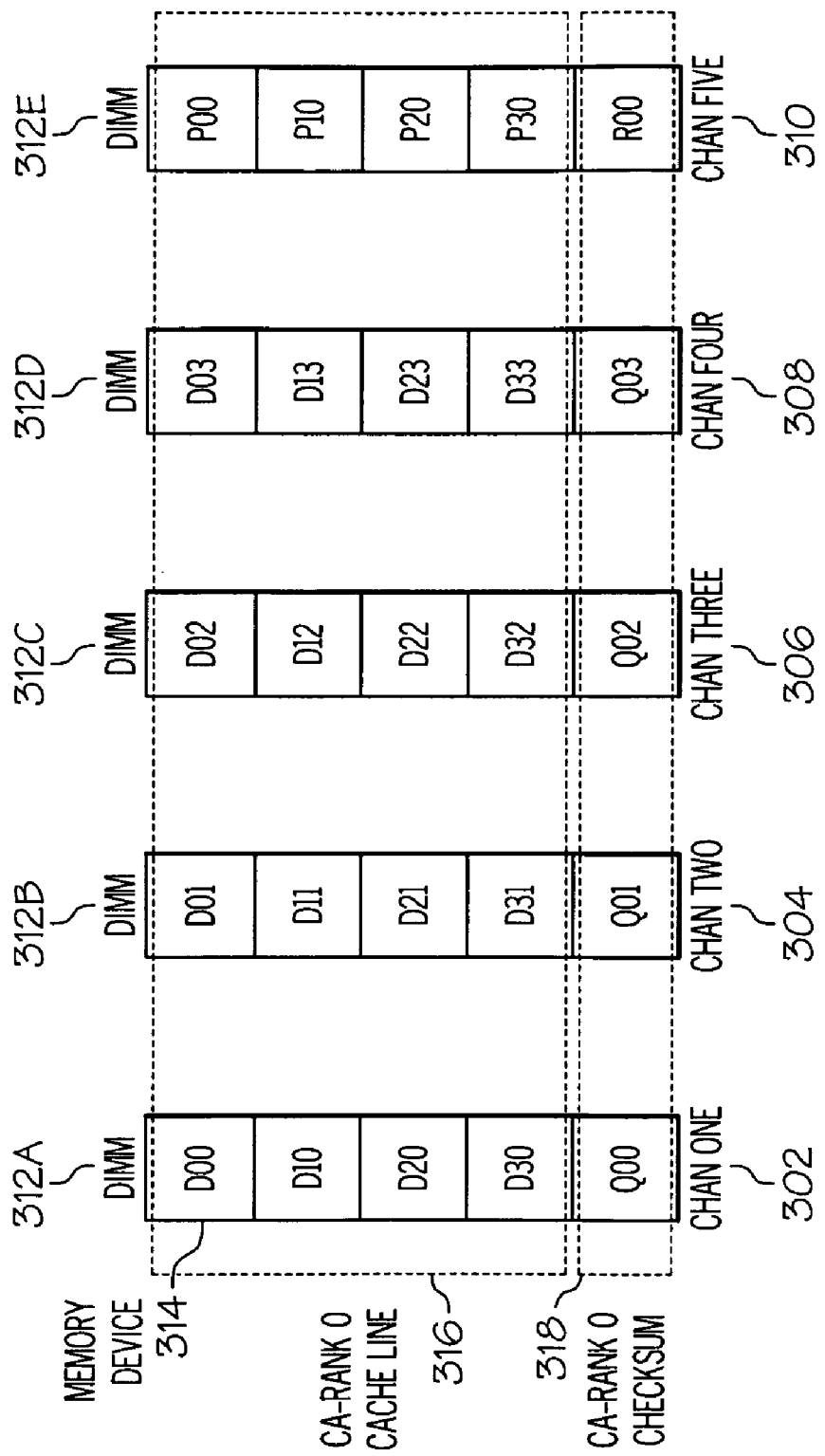
FIG. 3 depicts a memory system configuration with five memory modules and five memory devices per memory module in accordance with exemplary embodiments.

FIG. 3 depicts another embodiment, where instead of a DIMM design architected with multiple CA-Ranks, a single Rank DIMM design is utilizes with fewer DRAMs per DIMM to implement a high-availability memory system. As with FIG. 2, each column represents a single module of a single memory channel (e.g., channel one 302, channel two 304, channel three 306, channel four 308, and channel five 310) of a DIMM (e.g., DIMM 312A, 312B, 312C, 312D, and 312E), where each DIMM 312A-E includes five DRAM memory devices 314, as compared to the ten DRAM memory devices 214 per DIMM of FIG. 2. Looking across the memory channels 302-308, Dxy (D00, D01, . . . D33) are DRAM memory devices 314 that may store customer usable data. DRAMs that hold checksum information on each DIMM 312A-E are represented by Qxy (Q00, Q01, Q02, and Q03). These Qxy DRAMs may hold checksum information calculated across the customer usable data space D00-D33 using Reed-Solomon ECC generation techniques or more generally having linear codes, preferably having the MDS property. Cache line 316 associated with CA-Rank 0 may include 128 Bytes and checksum 318 associated with CA-Rank 0 may include 32 Bytes. The optional channel five 310 is also referred to as an error correction channel.

When optional channel five 310 is used, there are 9 checksum DRAMs, adding P00, P01, P02, P03, and R00 to the total. Again, standard Reed-Solomon decoding techniques may be inadequate when a full memory channel fails. Ten checksum DRAMs may be required to pinpointed and correct 5 full DRAM errors. Again, a list decoding technique can be used to pinpoint and mark a faulty DIMM. Once checksum symbols from 5 DRAMs are used to regenerate the data, it leaves the symbols in the remaining 4 checksum DRAMs to be used for secondary faults coincident with a full memory channel failure which allows up to 2 complete DRAM failure to be isolated and corrected.

Without the optional channel five 310, the 4 checksums in the 4 checksum DRAMs (Q00 . . . Q03) can pinpoint and correct at least 2 full DRAM failures, or the equivalent of 16 single symbol faults, assuming none of the checksum areas are used to hold other meta-data. The embodiment depicted in FIG. 3 reduces packaging and wiring densities of each of the DIMMs 312A-E as compared to DIMMs 212A-E of FIG. 2.

It should be noted that instead of a 5 x8 DRAM DIMM, a 4×8 DRAM DIMM may be used for memory systems where memory fault error correction is not required. Each DIMM 312 may have a data width of thirty-two bits if checksum DRAMs are excluded or forty-bits when at least one checksum DRAM is included per DIMM 312.

Figure 4:
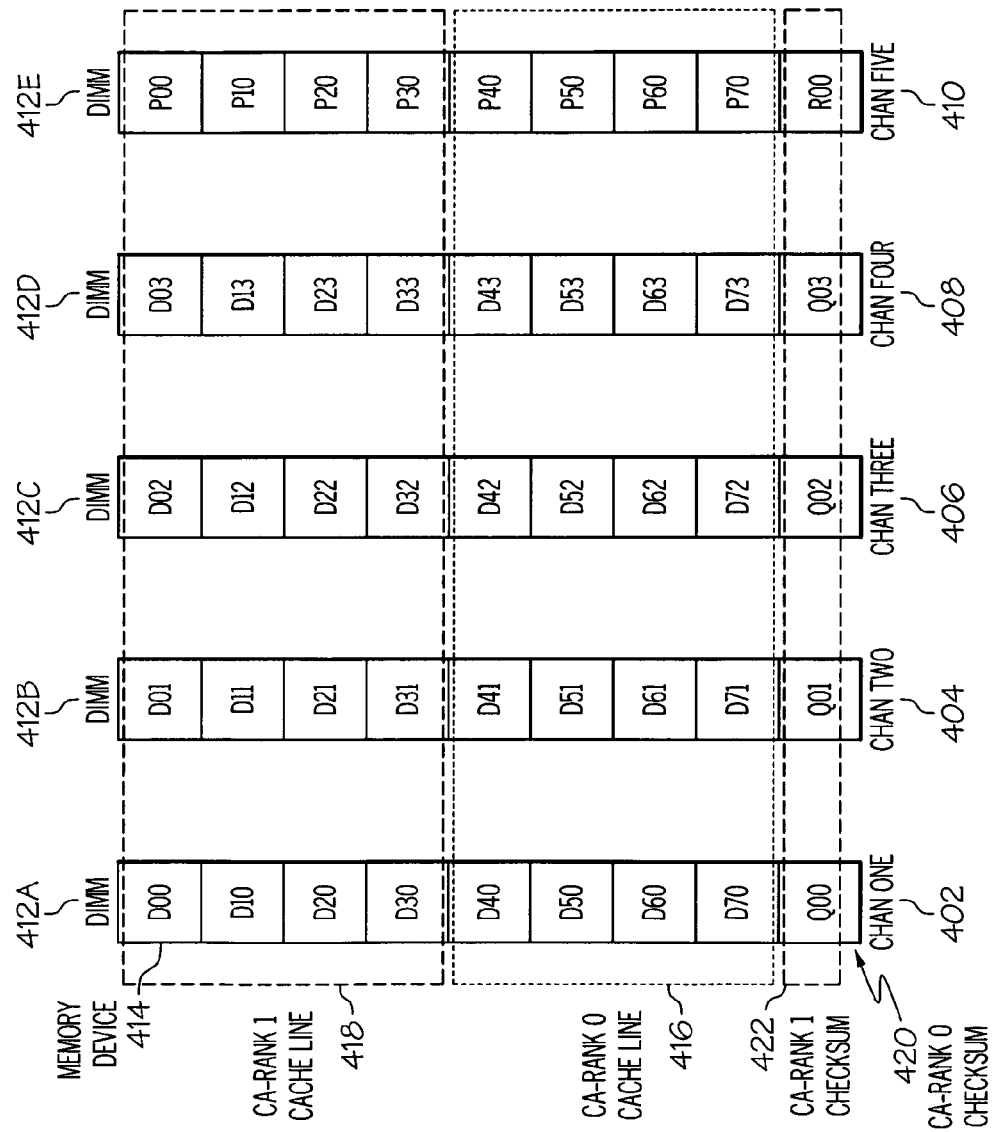
FIG. 4 depicts a memory system configuration with five memory modules and nine memory devices per memory module in accordance with exemplary embodiments.

FIG. 4 illustrates an embodiment using 9 x8 DRAMs 414 per DIMM 412 configured as 2 CA-Ranks. Again, each column represents a single module of a single memory channel (e.g., channel one 402, channel two 404, channel three 406, channel four 408, and channel five 410) of a DIMM (e.g., DIMM 412A, 412B, 412C, 412D, and 412E), where each DIMM 412A-E includes nine DRAM memory devices 414. Looking across the memory channels 402-408, Dxy (D00, D01 . . . D73) are DRAM memory devices 214 that may store customer usable data. DRAMs that hold checksum information on each DIMM 212A-E are represented by Qxy (Q00, Q01, Q02, and Q13). These Qxy DRAMs may hold checksum information calculated across the customer usable data space D00-D73 using Reed-Solomon ECC generation techniques or other ECC codes. The primary difference between this exemplary embodiment and that described in FIG. 2 is that there is a single checksum DRAM (e.g., Q00) that is shared between 2 CA-Ranks per DIMM 412. This reduces the number of checksum symbols stored on each of the 1st 4 channels 402-408 by half. When optional channel five 410 (also referred to as an error correction channel) is not used, the Reed-Solomon ECC may be used to locate and correct a full DRAM failure with the 16 checksum symbols, 4 symbols from each checksum DRAM, are available. Again, using techniques such as fault marking can increase the effectiveness of the ECC beyond a single DRAM fault.

The example depicted in FIG. 4 can result in a cache line 416 associated with CA-Rank 0 to include 128 Bytes and cache line 418 associated with CA-Rank 1 to also include 128 Bytes. Checksum 420, distributed across Q00-Q03 associated with CA-Rank 0, and checksum 422, also distributed across Q00-Q03 associated with CA-Rank 1, may include 16 bytes each.

Using independent access paths to the checksum DRAMs Q00-Q03 and R00 can optimize performance by eliminating potential access conflicts between the CA-Ranks. Alternatively, existing features in industry standard DRAMs, including Burst Chop and Data Mask, can be used to mitigate access conflicts. As a further alternative, 2 x4 DRAMs may be used for each checksum DRAM Q00-Q03 and R00. If the functionality of an x8 DRAM is modified to provide 2 x4 independent storage areas on the checksum DRAMs Q00-Q03 and R00, that would also prevent access conflicts, while keeping the number of DRAM memory devices per DIMM at 9, and simplifying the packaging.

Figure 5:
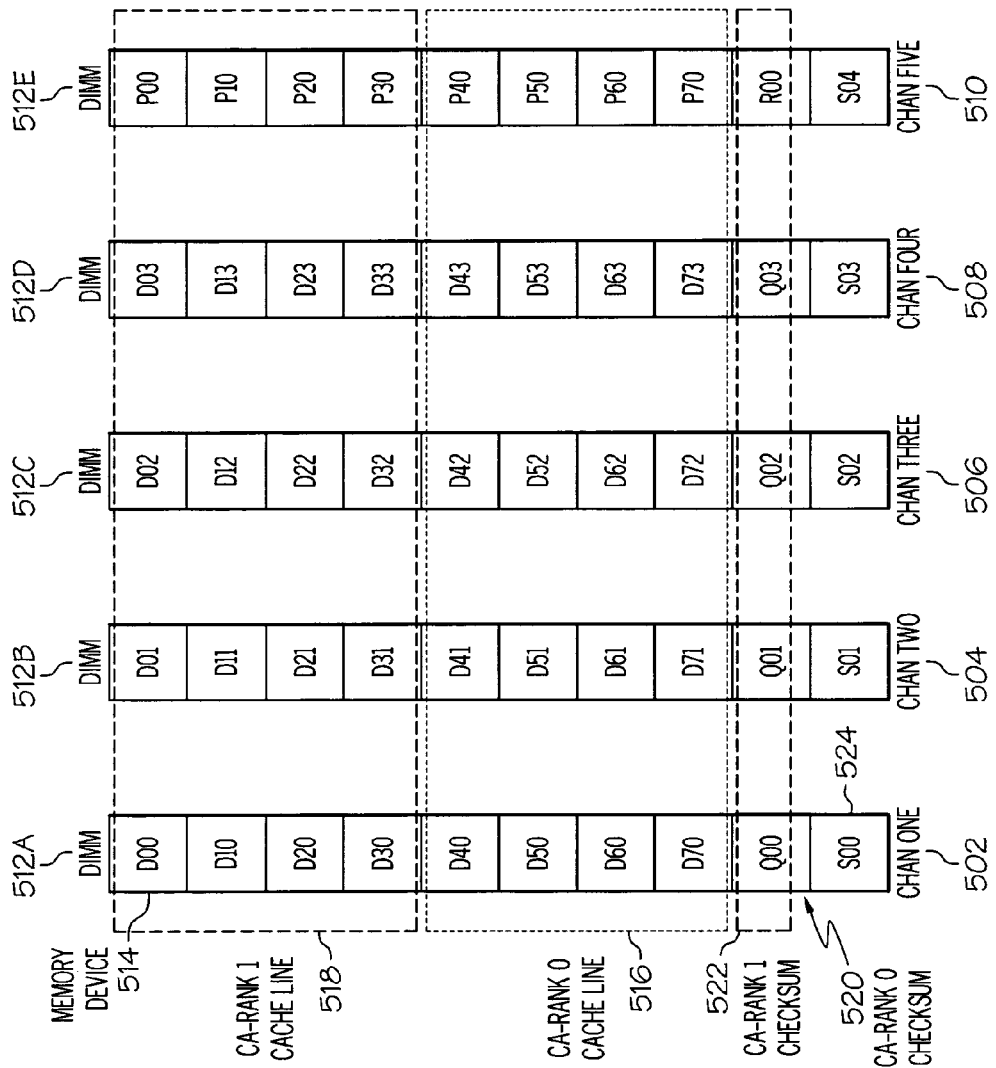
FIG. 5 depicts a memory system configuration with five memory modules and ten memory devices including a spare memory device per memory module in accordance with exemplary embodiments.

FIG. 5 depicts a memory system configuration with five memory modules and ten memory devices including a spare memory device per memory module in accordance with an exemplary embodiment. Each column represents a single module of a single memory channel (e.g., channel one 502, channel two 504, channel three 506, channel four 508, and channel five 510) of a DIMM (e.g., DIMM 512A, 512B, 512C, 512D, and 512E), where each DIMM 512A-E includes ten DRAM memory devices 514. Similar to the embodiment depicted in FIG. 4, the example depicted in FIG. 5 can result in a cache line 516 associated with CA-Rank 0 to include 128 Bytes and cache line 518 associated with CA-Rank 1 to also include 128 Bytes. Checksum 520, distributed across Q00-Q03 associated with CA-Rank 0, and checksum 522, also distributed across Q00-Q03 associated with CA-Rank 1, may include 16 bytes each. The primary difference between this exemplary embodiment and that described in FIG. 4 is that there is a physical spare memory device Sxy DRAM 524 per DIMM 512. If a DRAM failure is encountered on any DIMMs 512A-E, then the Sxy DRAM 524 associated with that DIMM 512 is used instead of the failed DRAM as a physical back up. This may improve the robustness of the error correction capability, enabling it to withstand another full DRAM failure over and above what the checksums can handle.

Various modifications can be made to the memory system configurations described in reference to FIGS. 1-5 within the scope of the invention. For example, the embodiment depicted in FIG. 2, including up to 5 DIMMs 212 with 10 DRAM memory devices 214 per DIMM 212 can be further partitioned to support four CA-Ranks, as compared to the 2 CA-Ranks of FIG. 2. In this embodiment, the cache line size stored in memory can be further reduced to 64 Bytes, with 16 byte checksums per rank stored in the checksum Qxy DRAMs. To support four CA-Ranks, four independent busses may be implemented from the DIMMs, as compared to two independent busses for accessing two CA-Ranks of DIMMs 212A-E. This embodiment may share Qxy DRAMs for checksums as described in reference to FIG. 4. A further option is to remove the checksum Qxy DRAMs one or more of the DIMMs 212 and group them on one or more DIMMs, such as a dedicated error checking DIMM.

Another modification to the embodiment depicted in FIG. 2 is to further subdivide the DIMMs 212A-E, such that each row of data DRAMs (e.g., D00-D03, D10-D13, etc.) is a separate rank, resulting in 8 CA-Ranks. To support simultaneous access to all 8 CA-Ranks, 8 independent busses may be implements to each of the DIMMs. Again, access to the checksum DRAMs Q00-Q13, R00 and R10 can be shared between the 8 CA-Ranks. This results in a 32 byte cache line size and 16 bytes of checksum per CA-Rank. It should also be noted that if memory fault error correction is not required, the 5th memory channel 212E can be eliminated, as well as the 2 checksum Qxy DRAMs per DIMM 212A-D, allowing for DIMMs with 8 DRAMs each. Such an embodiment may provide 8 independent DIMM bus interfaces to allow access all CA-Ranks simultaneously for increased independent access frequency.

As burst lengths increase from 8 to 16, the memory system configuration as described with respect to FIG. 2 can be further modified as 4 CA-Ranks with 128-byte cache lines per CA-Rank and 32 bytes per checksum, or 8 CA-Ranks with 64-byte cache lines per CA-Rank and 16 bytes per checksum. The net effect is that the stored cache line size doubles, and the robustness of the memory fault error correction may be reduced because twice as many symbols are lost if a DRAM fails.

In order to determine an optimum number of single rank customer usable data DRAMs per DIMM Rank, the following equation can be used:

$$\text{Optimum number of data DRAMs per DIMM (in Bytes)} = (8 \times CL)/(S \times BL \times MC)$$

Where:
S=number of single DRAM data bits
CL=Cache line size in Bytes
BL=Burst length per DRAM access MC=number of Memory channels over which single cache line is stored.

For example, if an x4 DRAM has a burst length of 8 and 2 memory channel are used for a cache line size of 128 Bytes, then the optimum number of customer usable data DRAMs per DIMM is 16. If x8 DRAMs are used, then the number of DRAMs per DIMM is 8. In an exemplary embodiment, x8 DRAMs with 4 memory channels and bursts of 8 with a 128 Byte cache line results in the optimum number of data DRAMs per DIMM as 4.

The total number of DRAMs per DIMM may also be dictated by memory fault recovery requirements, which is a function of the symbol size used on checksums/ECC. To survive a full DRAM chip failure with a completely random symbol failure, twice the number of checksum symbols over the number of symbols a single DRAM stores may be used. If fault marking is used, further improvements may be realized. However, if one or more of the checksum symbols per cache line are used for other meta-data, then correction capability may be lowered. Distributing the checksum symbols across at least 2 DRAMs can also improve error-handling performance. The greater the number memory devices used to distribute checksum information, the more of that information is preserved in the event of any one DRAM memory device failure. In exemplary embodiments, 1 or 2 checksum DRAMs per DIMM are spread across 4 memory channels, which can provide robust fault recovery, because only a small number of symbols may be lost on any single DRAM failure, even when symbols are shared across multiple CA-Ranks.

Figure 6:
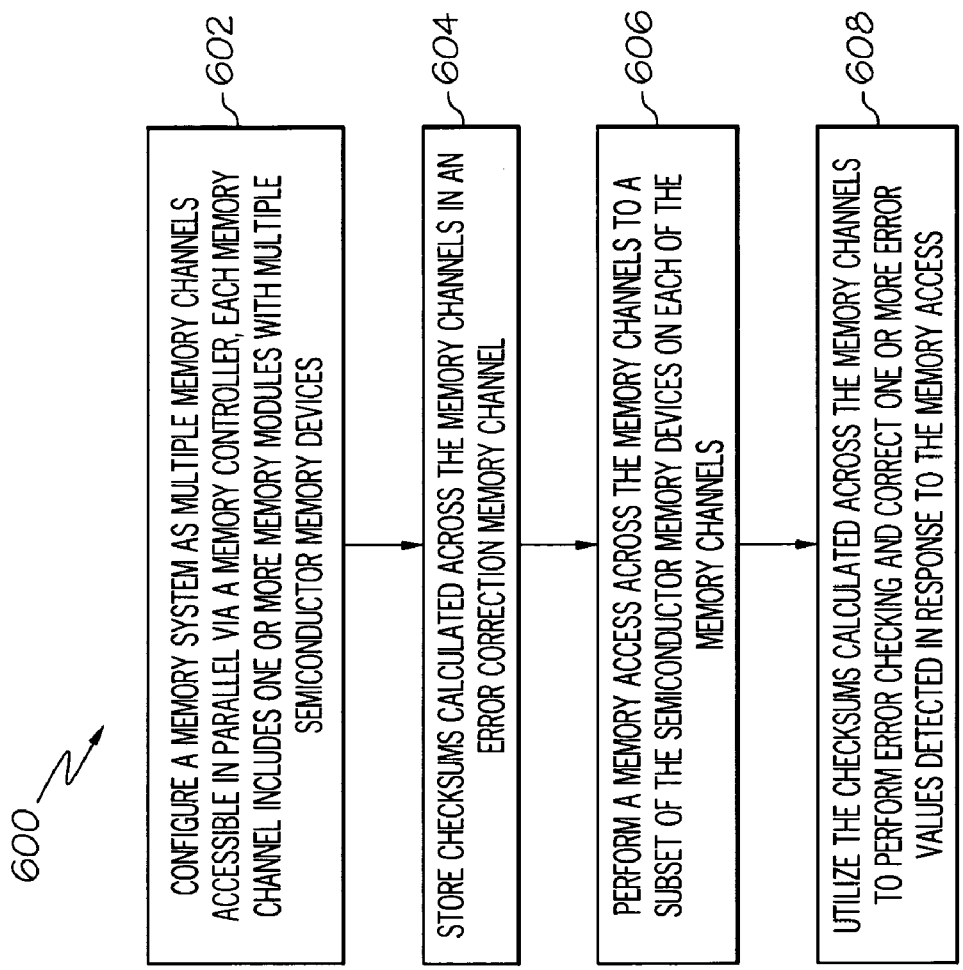
FIG. 6 depicts an exemplary process for providing a high availability memory system that may be implemented by exemplary embodiments.

FIG. 6 depicts an exemplary process 600 for providing a high availability memory system of semiconductor devices in a modular architecture. The high availability characteristics may be realized through the use of partial ranks, multiple memory channels, and/or concurrently accessible ranks that minimize the impact of failures, allowing the memory system to continue to operate unimpaired in the presence of a full memory module failure. For example, the process 600 may be implemented in memory system 100 of FIG. 1 or in various embodiments described in reference to FIGS. 2-5. For purposes of explanation, the process 600 is described in reference to the memory system 100 of FIG. 1. At block 602, the memory system 100 is configured as multiple memory channels 106-112 accessible in parallel via memory controller 134. Each memory channel 106-112 includes one or more memory modules 116 including multiple semiconductor memory devices 122. The memory modules 116 can be further subdivided as two or more concurrently accessible partial ranks. The concurrently accessible partial ranks enable concurrent independent access to the semiconductor memory devices 122 on each of the memory modules 116.

At block 604, the memory controller 134 stores checksums calculated across the memory channels 106-112. The checksums can be stored in memory channel 114 as an error correction memory channel or on one or more of the memory channels 106-112. The checksums may be calculated across the memory devices 122 distributed across the memory channels 106-112. In an exemplary embodiment, the checksums are Reed-Solomon codes. Data accesses can be partitioned between multiple concurrently accessible partial ranks per memory module 116. Each memory module 116 may also include one or more checksum memory devices (e.g., Qxy of FIGS. 2-5) to store column checksums, such as ECC values, calculated on columns per concurrently accessible partial rank.

At block 606, the memory controller 134 performs a memory access across the memory channels 106-112 to a subset of the semiconductor memory devices 122 on each of the memory channels 106-112, accessing one of the concurrently accessible partial ranks. Each subset may be a partial rank of a full rank distributed across two or more memory channels. The checksum values in the error correction memory channel (e.g., memory channel 114) are also accessed for use by the error handler 140.

At block 608, the error handler 140 utilizes the checksums calculated across the memory channels 106-112 to perform error checking and correct one or more error values detected in response to the memory access. The correction can include replacement values for a single memory device 122, a memory module 116, or a complete memory channel 106-112. The error handler 140 can also utilize additional checksum values, such as Qxy and Rxy of FIGS. 2-5, for fault isolation and localized error correction. The error checking compensates for insertion and removal of one or more memory modules 116 on one of the memory channels 106-112 while the memory system 100 remains operational. Thus, memory modules 116 can be inserted or removed without de-powering the memory system 100. Concurrent repair of the memory system 100 may be achieved by physically replacing a failed memory module 116 and rewriting the replaced memory module with correct data and checksum values to restore the full error correction capability of the memory system 100.

Figure 7:
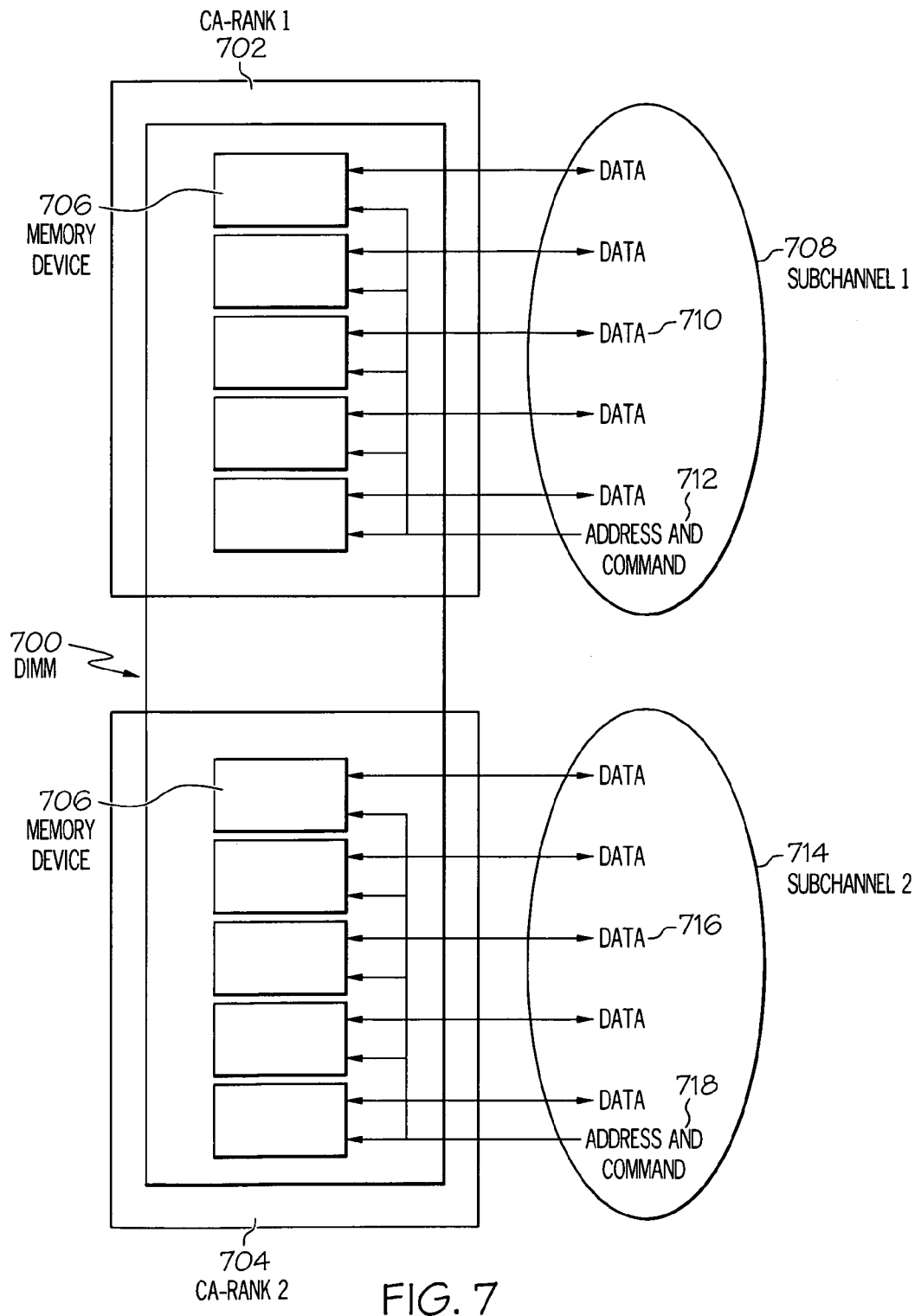
FIG. 7 depicts an example of two concurrently accessible partial ranks on a memory module that are accessible via separate subchannels.

FIG. 7 depicts an example of two concurrently accessible partial ranks on a memory module that are accessible via separate subchannels. In an exemplary embodiment, DIMM 700 includes two concurrently accessible partial ranks, CA-Rank one 702 and CA-Rank two 704. Each of the CA-Ranks 702 and 704 include memory devices 706. The memory devices 706 of CA-Rank one 702 can be accessed via subchannel one 708, which can include one or more memory device bus segments 710 and address and command links 712. The memory devices 706 of CA-Rank two 704 can be accessed via subchannel two 714, which can include one or more memory device bus segments 716 and address and command links 718. Thus, it can be seen that the two CA-Ranks 702 and 704 may be accessed independently using subchannels 708 and 714. This enables concurrent accesses to separate addresses for CA-Rank one 702 and CA-Rank two 704. The subchannels 708 and 714 may be portions of a larger bus for a channel, such as communication link 118 and/or communication link 120 of channel one 106 of FIG. 1. The multi-subchannel design of FIG. 7 can be implemented for the DIMMs 116, 212, 412, and 512 of FIGS. 1, 2, 4, and 5 respectively, as well as in other configurations that may be apparent to one skilled in the art.

Figure 8:
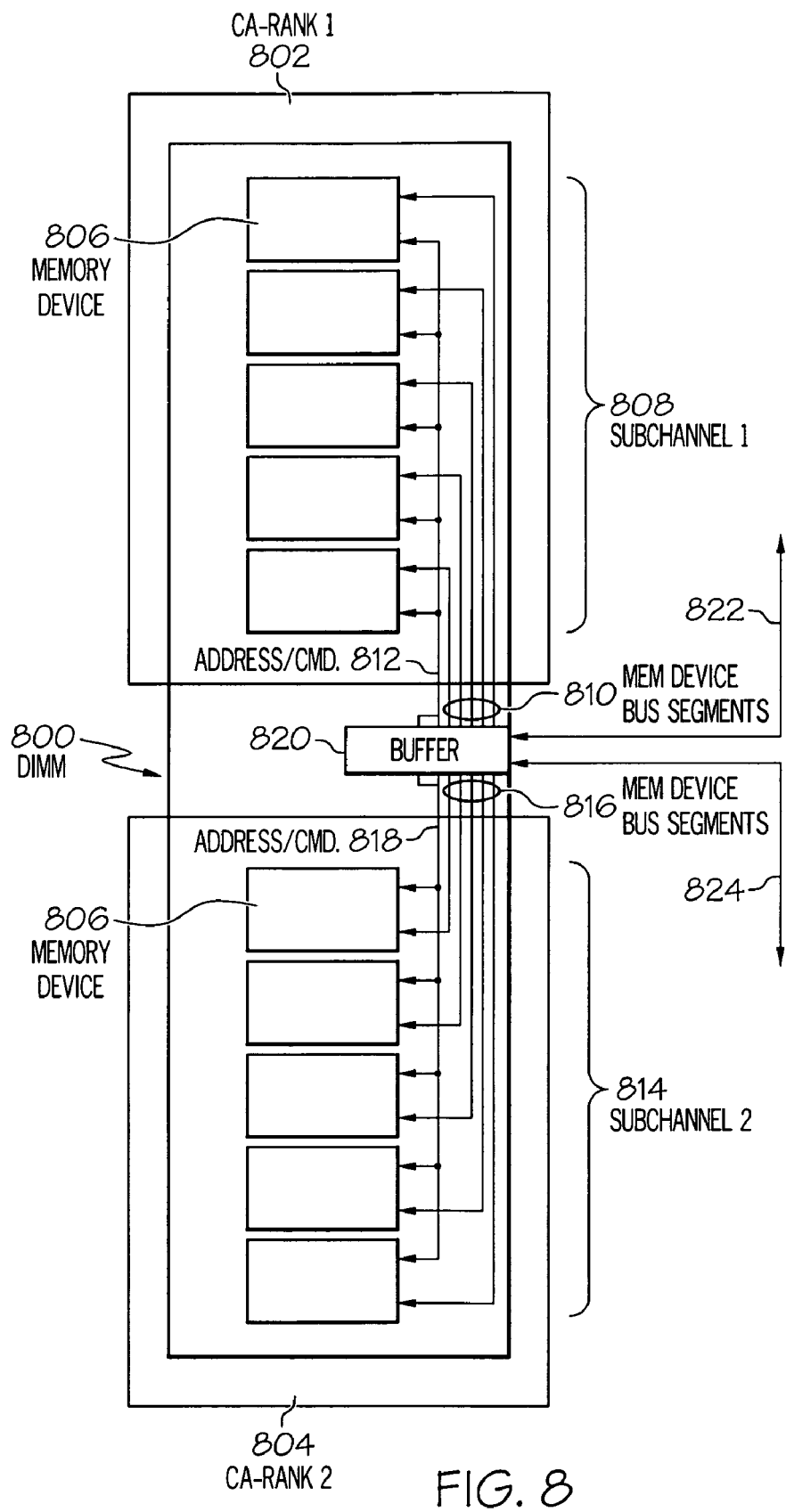
FIG. 8 depicts another example of two concurrently accessible partial ranks on a memory module that are accessible via separate subchannels using a buffer device.

FIG. 8 depicts an example of two concurrently accessible partial ranks on a memory module that are accessible via separate subchannels and buffered using a buffer device. In an exemplary embodiment, DIMM 800 includes two concurrently accessible partial ranks, CA-Rank one 802 and CA-Rank two 804. Each of the CA-Ranks 802 and 804 include memory devices 806. The memory devices 806 of CA-Rank one 802 can be accessed via subchannel one 808, which can include one or more memory device bus segments 810 and address and command links 812. The memory devices 806 of CA-Rank two 804 can be accessed via subchannel two 814, which can include one or more memory device bus segments 816 and address and command links 818. Thus, it can be seen that the two CA-Ranks 802 and 804 may be accessed independently using subchannels 808 and 814. This enables concurrent accesses to separate addresses for CA-Rank one 802 and CA-Rank two 804. The subchannels 808 and 814 may be routed into buffer device 820 to independently manage each CA-Rank. The buffer device 820 may be equivalent to the hub devices 104 of FIG. 1, enabling communication protocol and formatting changes with respect to communication links 822 and 824 as part of a larger memory channel. For example, communication links 822 and 824 may be equivalent to communication links 118 and 120 of channel one 106 of FIG. 1. The multi-subchannel design of FIG. 8 can be implemented for the DIMMs 116, 212, 412, and 512 of FIGS. 1, 2, 4, and 5 respectively, as well as in other configurations that may be apparent to one skilled in the art.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include improving memory fault correction while maintaining or shrinking cache line size and avoiding a substantial loss in memory space for customer usable data. Partitioning DIMMs into concurrently accessible ranks across multiple memory channels reduces the impact of a failed DRAM memory chip, DIMM, and/or memory channel. Accessing a subset of DRAMs per DIMM may also lower active power. Active power can be spread more evenly across all the DIMMs in the memory channels, rather than accessing all DRAMs on a single DIMM concurrently. Providing an additional DIMM and memory channel for RAID-like recovery can further enhance memory system reliability without significantly increasing the quantity of data handled on any access. As servers/host systems continue to increase the number of processing cores, shrinking cache line size can increase system performance. The use of an additional DRAM per DIMM may improve the robustness of error correction codes (ECC), allowing even a single channel DIMM constructed with x8 DRAMs to provide chipkill (loss of a DRAM device) correction capability. Utilizing these additional DRAMs may also improve handling of a soft error coincident with a full DRAM fault. Further technical effects include the capability to hot swap DIMMs, concurrently replace or add DIMMs to repair or upgrade the memory system without taking the system down, while running unimpaired during these operations.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A memory system comprising:
multiple memory channels, each memory channel comprised of:
at least one memory module comprised of memory devices organized as partial ranks coupled to memory device bus segments, each partial rank including a subset of the memory devices accessible as a subchannel on a subset of the memory device bus segments; and
a memory controller in communication with the multiple memory channels, the memory controller distributing an access request across the memory channels to access a full rank, the full rank comprised of at least two of the partial ranks on separate memory channels.

2. The memory system of claim 1 wherein the memory system further comprises one or more checksum memory devices storing checksum data, and the memory controller further comprises an error handler, the error handler calculating a check value as a function of data received in response to the access request and the checksum data associated with the data to determine whether an error exists.

3. The memory system of claim 2 wherein the one or more checksum memory devices are located on common memory modules with the partial ranks, and the checksum data is an error correction code.

4. The memory system of claim 2 further comprising a cache memory with a cache line size equal to an amount of data received, and further wherein the error handler fixes at least one error value in the data received prior to writing the data to the cache memory in response to determining that the error exists.

5. The memory system of claim 2 wherein an error correction memory channel implements error checking across a group of the memory modules selected from the memory channels.

6. The memory system of claim 5 wherein the error checking applies a Reed-Solomon code.

7. The memory system of claim 5 wherein the error checking compensates for insertion and removal of one or more memory modules on one of the memory channels while the memory system remains operational.

8. The memory system of claim 5 wherein the memory system is comprised of four memory channels and the error correction memory channel implementing the error checking across the four memory channels, and each memory module includes two or more of the checksum memory devices.

9. The memory system of claim 1 wherein the partial ranks are concurrently accessible per memory module, enabling the memory controller to concurrently access different addresses on the same memory module.

10. The memory system of claim 1 further comprising:
a buffer device between the memory controller and the memory devices, the buffer device providing a communication interface to distribute the access request to a targeted subset of the memory device bus segments.

11. The memory system of claim 1 wherein at least one of the memory modules includes multiple concurrently accessible partial ranks, and at least one checksum memory device is shared between at least two of the concurrently accessible partial ranks.

12. A method for providing a memory system with high availability, comprising:
configuring the memory system as multiple memory channels accessible in parallel via a memory controller, each memory channel comprised of:
at least one memory module comprised of memory devices organized as partial ranks coupled to memory device bus segments, each partial rank including a subset of the memory devices accessible as a subchannel on a subset of the memory device bus segments;
storing checksums calculated across the memory channels;
performing a memory access to a full rank comprised of at least two of the partial ranks on separate memory channels; and
utilizing the checksums to perform error checking and correct one or more error values detected in response to the memory access to the full rank.

13. The method of claim 12 wherein the checksums apply Reed-Solomon codes to correct for a failure in one of the memory channels by erasure marking memory devices that are identified as having incorrect information and feeding the erasure marks to a decoder that is capable of marked erasure decoding.

14. The method of claim 12 further comprising:
configuring the one or more memory modules as multiple concurrently accessible partial ranks, wherein the concurrently accessible partial ranks enable concurrent independent access to the memory devices on the memory modules via independent subchannels per memory channel; and
performing the memory access across the memory channels to one or more of the concurrently accessible ranks.

15. The method of claim 12 wherein the error checking compensates for insertion and removal of one or more memory modules on one of the memory channels while the memory system remains operational.

16. A computer program product for providing a memory system with high availability, the memory system comprising multiple memory channels accessible in parallel via a memory controller, each memory channel comprised of one or more memory modules including multiple semiconductor memory devices, the computer program product comprising a storage medium readable by a processing circuit and storing instructions for execution by the processing circuit for facilitating a method comprising:
storing checksums calculated across the memory channels;
performing a memory access across the memory channels to a subset of the semiconductor memory devices on each of the memory channels, wherein the subset is a partial rank of a full rank distributed across the memory channels; and
utilizing the checksums calculated across the memory channels to perform error checking and correct one or more error values detected in response to the memory access.

17. The computer program product of claim 16, wherein one or more memory modules are configured as multiple concurrently accessible partial ranks, wherein the concurrently accessible partial ranks enable concurrent independent access to the semiconductor memory devices on each of the memory modules via independent subchannels per memory channel, and the method facilitated by the computer program product further comprises:
performing the memory access across the memory channels to one or more of the concurrently accessible partial ranks.

18. The computer program product of claim 17 further wherein at least one of the semiconductor memory devices holds a column checksum per concurrently accessible partial rank and the method facilitated by the computer program product further comprises:
utilizing the column checksum to perform error checking and correct one or more error values detected in response to the memory access.

19. A memory system with high availability comprising:
at least two memory modules on separate memory channels, each memory module comprising a partial rank of semiconductor memory devices arranged on the memory module to output a burst of data words in response to an access request, the partial rank having a data width of thirty-two bits, wherein the partial ranks from at least two of the memory channels are combined to form a full rank; and
one or more memory devices to store one or more checksums calculated across the full rank and support error correction for a failure of one or more of the memory modules.

20. The memory system of claim 19 wherein each memory module further comprises:
a checksum memory device, the checksum memory device configured to store a checksum calculated across the semiconductor memory devices of the memory module and adding eight bits in width to the partial rank of the memory module.

21. The memory system of claim 20 wherein the column checksum is an error correction code.

22. A memory module comprising:
at least nine semiconductor memory devices arranged on the memory module with at least eight of the semiconductor memory devices configured as at least two partial ranks to output a burst of data words per partial rank comprising eight bits per data word in response to an access request, and at least one of the semiconductor memory devices is a checksum memory device outputting a checksum value in response to the access request.

23. The memory module of claim 22 wherein the partial ranks are concurrently accessible via independent subchannels on separate busses of a communication link.

24. The memory module of claim 23 wherein the checksum memory device is shared between at least two of the partial ranks.

25. The memory module of claim 23 wherein one of the semiconductor memory devices is a second checksum memory device, and further wherein the checksum device and the second checksum memory device store separate checksums associated with different partial ranks on the memory module.

* * * * *